(12) United States Patent
Patel et al.

(10) Patent No.: US 12,528,600 B2
(45) Date of Patent: Jan. 20, 2026

(54) METHODS AND APPARATUS TO REPAIR COMPOSITE AIRFOIL STRUCTURES

(71) Applicant: The Boeing Company, Arlington, VA (US)

(72) Inventors: Jay Jitendra Patel, Irvine, CA (US); Shrish Shrinivas Kale, Irvine, CA (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 18/354,994

(22) Filed: Jul. 19, 2023

(65) Prior Publication Data

US 2025/0026493 A1    Jan. 23, 2025

(51) Int. Cl.
  *B64F 5/40* (2017.01)
  *B29C 73/02* (2006.01)
  *B29C 73/10* (2006.01)
  *B29L 31/30* (2006.01)

(52) U.S. Cl.
  CPC .............. *B64F 5/40* (2017.01); *B29C 73/02* (2013.01); *B29C 73/10* (2013.01); *B29L 2031/3085* (2013.01)

(58) Field of Classification Search
  CPC . B64F 5/40; B29C 73/02; B29C 73/10; B29L 2031/3085; B64C 3/28; B64C 27/473; B64C 1/12; B26D 3/085
  See application file for complete search history.

(56) References Cited

U.S. PATENT DOCUMENTS

| | | |
|---|---|---|
| 11,312,507 B2 | 4/2022 | Cheng et al. |
| 2004/0118978 A1* | 6/2004 | Anning ................. B64C 27/473 244/123.1 |
| 2007/0062166 A1* | 3/2007 | Velasquez Urey .... B26D 3/085 53/513 |
| 2012/0163981 A1* | 6/2012 | Hong ...................... B29C 73/26 156/278 |
| 2015/0298787 A1* | 10/2015 | Nordin ...................... B64C 3/28 244/45 R |
| 2017/0029088 A1* | 2/2017 | Gruner .................... B32B 27/18 |
| 2020/0247476 A1* | 8/2020 | Ritz ........................ B60R 11/04 |
| 2021/0061491 A1* | 3/2021 | Cheng ....................... B64C 1/12 |
| 2021/0237867 A1* | 8/2021 | Georgeson ............. B64U 10/13 |

FOREIGN PATENT DOCUMENTS

CN    115230984 A    10/2022

OTHER PUBLICATIONS

European Patent Office, "Extended European Search Report," issued in connection with European Patent Application No. 24187180.5, dated Dec. 6, 2024, 6 pages.

* cited by examiner

*Primary Examiner* — Lee A Holly
(74) *Attorney, Agent, or Firm* — Hanley, Flight & Zimmerman, LLC

(57) ABSTRACT

Systems, apparatus, articles of manufacture, and methods are disclosed to repair a semi-monocoque wing comprising: a doubler plate configured to be coupled to a skin of the semi-monocoque wing via a first adhesive, the doubler plate having a contour substantially complementary to a contour of a leading edge of the semi-monocoque wing; and a layer of tape positioned at least partially along at least a portion of an interface between an edge of the doubler plate and the leading edge of the skin.

15 Claims, 9 Drawing Sheets

METHODS AND APPARATUS TO REPAIR COMPOSITE AIRFOIL STRUCTURES

FIELD OF THE DISCLOSURE

This disclosure relates generally to aircraft and, more particularly, to methods and apparatus to repair composite airfoil structures.

BACKGROUND

Many aircraft use a monocoque and/or semi-monocoque structures to carry primary stresses and/or maintain rigidity of a wing leading edge, winglet and/or wingtip of the aircraft. The monocoque and/or semi-monocoque structures can be susceptible to impact damage and require repair for aerodynamic requirements of an aircraft.

Figure 1:
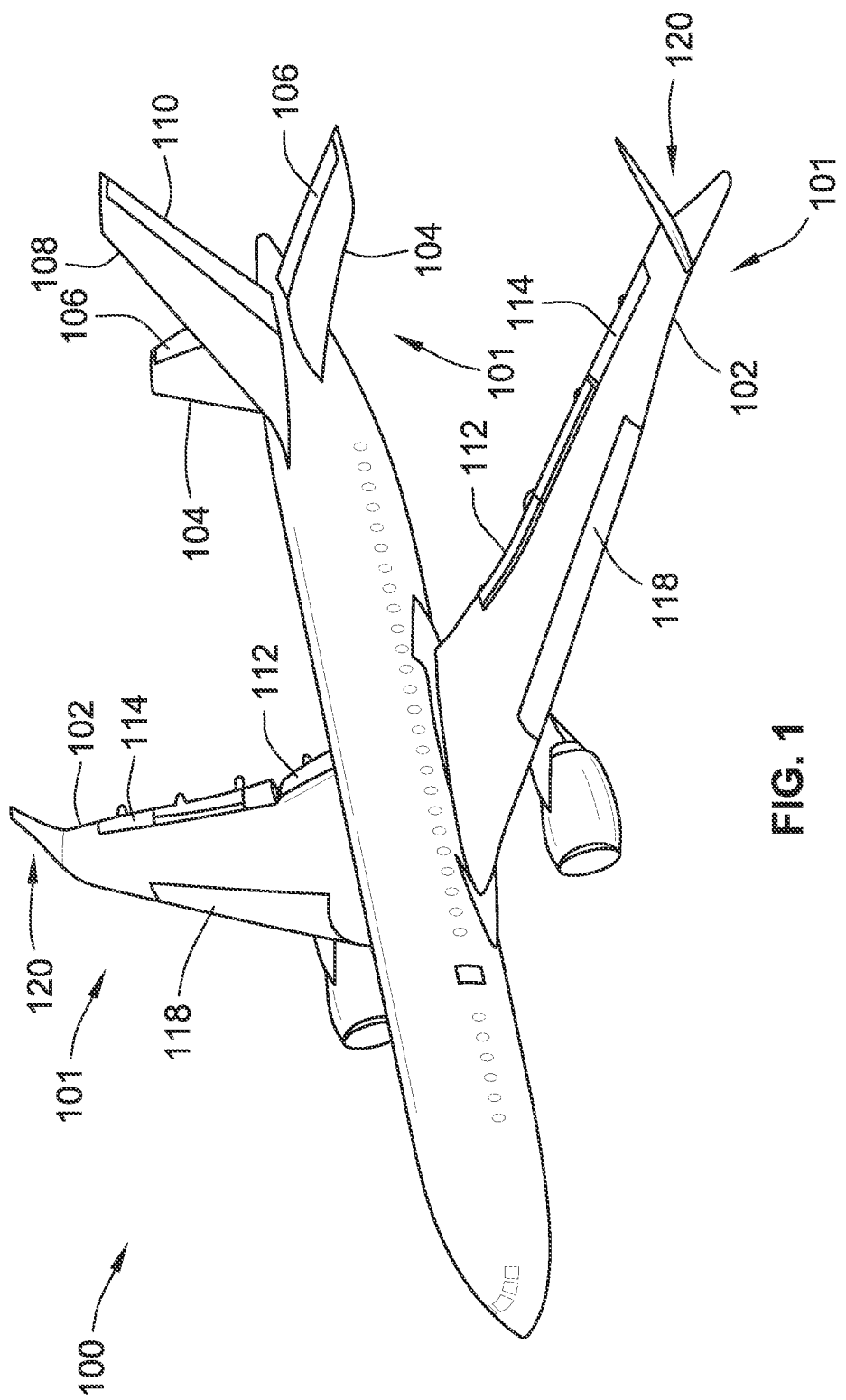
FIG. 1 is a perspective view of an example aircraft having example repairable structures in accordance with teachings of this disclosure.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately," "substantially" and "about" modify their subjects/values to recognize the potential presence of variations that occur in real world applications. For example, "approximately," "substantially" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. For example, substantially smooth may indicate perfectly smooth or a shape that although deviates from perfectly smooth, provides a smooth surface having characteristic of an almost perfectly smooth surface absent certain non-smooth or rough portions. For example, substantially complementary as used herein indicates that a shape perfectly matches another shape or almost perfectly matches but for some imperfections.

DETAILED DESCRIPTION

The construction of composite wings portions, wing leading edges, winglets, wingtips and/or other airfoil structures (e.g., composite airfoil structures) vary from truss structural arrangements to monocoque shell structures and semi-monocoque shell structures. Monocoque and semi-monocoque structures are structural skins that carry tensile and compressive forces. These monocoque and semi-monocoque structures are subject to damage that can be caused by impact with ground support equipment and/or caused by bird strikes during flight. As used herein, a monocoque structure is a structural system in which loads are supported by an object's external skin. As used herein, a semi-monocoque structure refers to a stressed shell structure that is like a monocoque, but which derives at least some of its strength from conventional reinforcement structures including, for example, spars, ribs. stringers, longerons, frames, and/or other structural components.

Damage to the monocoque and/or semi-monocoque structures can compromise structural integrity and/or affects the aerodynamic characteristics of the structure (e.g., airfoil) that can lead to flutter and/or reduce aircraft efficiency (e.g., increase drag resulting in higher fuel usage). In some scenarios, damage to the structure leaves parts of the aircraft susceptible to water and/or debris damage. Thus, rapid repairs are required to monocoque structures for the aircraft to be operational per aviation standards. However, known techniques to repair monocoque and/or semi-monocoque structures are time consuming and typically require the use of mechanical fasteners and/or a metal forming tool(s). For example, some repairs can take several days, leaving the aircraft inoperable or unusable for this duration of time. Moreover, only certain hubs or airports provide tools necessary for repair and/or inspection.

Examples described herein allow for quick and simple repairs of winglets, wingtips and/or other airfoil structures without the use of the metal forming tools and/or mechanical fasteners (e.g., rivets, screws, etc.). Examples methods and apparatus disclosed herein allow repairs to aircraft structure(s) that enable the aircraft to operate and/or postpone inspection until the aircraft can fly to a hub or airport with the available tooling to perform permanent repairs and/or inspections. Example methods and apparatus described herein can provide a temporary repair to an aircraft structure (e.g., a monocoque shell structure and semi-monocoque shell structure, an airfoil, etc.) until more durable and permanent repairs can be made to the structure. In some examples, methods and apparatus disclosed herein can postpone a permanent aircraft repair for at least six months, enabling the aircraft to continue normal operation (e.g., flights) without having to decommission the aircraft.

FIG. 1 is a perspective view of an example aircraft 100 having example airfoil structures 101 that can be repaired in accordance with teachings of this disclosure. The airfoil structures 101 of the illustrated example can include various types of airfoils, wing structures, monocoque structures and/or semi-monocoque structures of the aircraft 100. For example, the airfoil structures 101 composed of composite materials can include, but not limited to, wing leading edge(s) 102, horizontal stabilizers leading edge(s) 104, elevators 106, a vertical stabilizer leading edge(s) 108, a rudder 110, flaps 112, ailerons 114, slats 118, winglets 120, and/or any other suitable airfoil, monocoque and/or semi-monocoque structure(s). In the depicted example, the wings 102 include the winglets 120.

Aircraft 100 is an example aircraft in which a doubler repair disclosed herein can be implemented in accordance with an illustrative embodiment. The aircraft 100 of the illustrated example is a commercial airliner. However, the example methods and apparatus disclosed herein are not limited to the example aircraft 100 of FIG. 1. In some examples, the aircraft 100 can be a military aircraft, a rotorcraft, a helicopter, an unmanned aerial vehicle, and/or any other suitable vehicle or aircraft.

Figure 2:
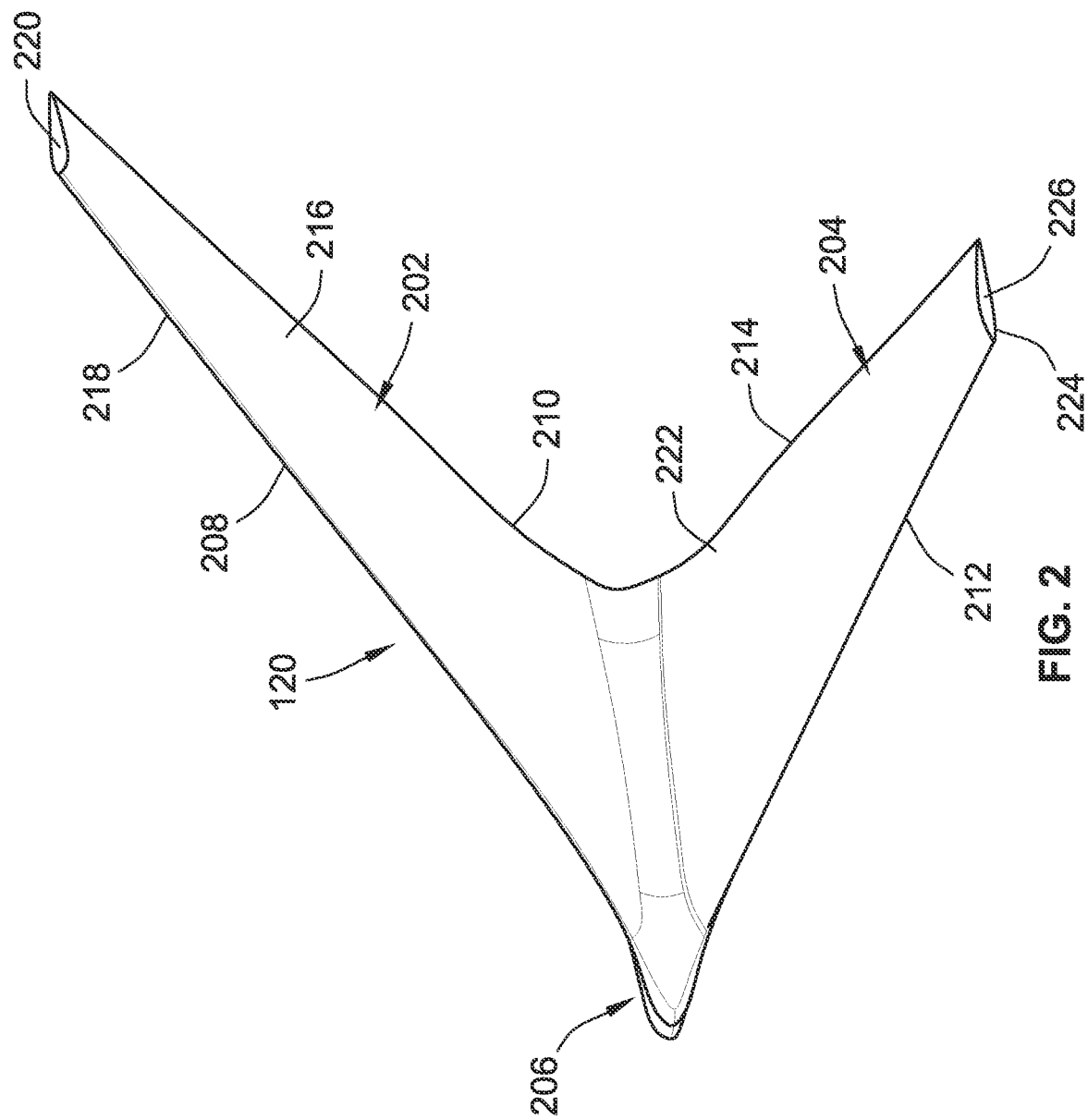
FIG. 2 is a perspective view of an example winglet of the example aircraft of FIG. 1 in an operable or non-damaged state.

FIG. 2 illustrates the winglet 120 of the example aircraft 100 of FIG. 1. The winglet 120 of the illustrated example is a one-piece, bifurcated winglet. For example, the winglet 120 is part of the wing 102 and is composed of composite material. The winglet 120 of the illustrated example has a plurality of blades. The blades of the illustrated example are arranged at an angle with respect to one another. As depicted, the bifurcated winglet 120 of the illustrated example has a first or upper blade 202 arranged at an angle relative to a second or lower blade 204. In some examples, the components within the winglet 120 have been co-cured to form a single part. As a result, fasteners or other components are not needed to connect one portion (e.g., the upper blade 202) of the winglet 120 to another portion (e.g., the lower blade 204) of the winglet 120. The winglet 120 has a smooth surface in this illustrative example. The winglet 120 is configured to create natural laminar flow.

As depicted, the winglet 120 includes the upper blade 202, the lower blade 204, and a root region 206. In this illustrative example, the upper blade 202 has a length that is greater than a length of the lower blade 204. In some illustrative examples, the upper blade 202 and the lower blade 204 can be the same length. As illustrated, the upper blade 202 includes a leading edge 208 and a trailing edge 210, and the lower blade 204 includes a leading edge 212 and a trailing edge 214. The upper blade 202 has an outboard side or skin 216, an inboard side or skin 218, and a tip 220. In a similar fashion, the lower blade 204 has an upper skin 222 (e.g., upper surface), a lower skin 224 (e.g., lower surface), and a tip 226. The lower blade 204 can be a monocoque structure or a semi-monocoque structure.

Figure 3:
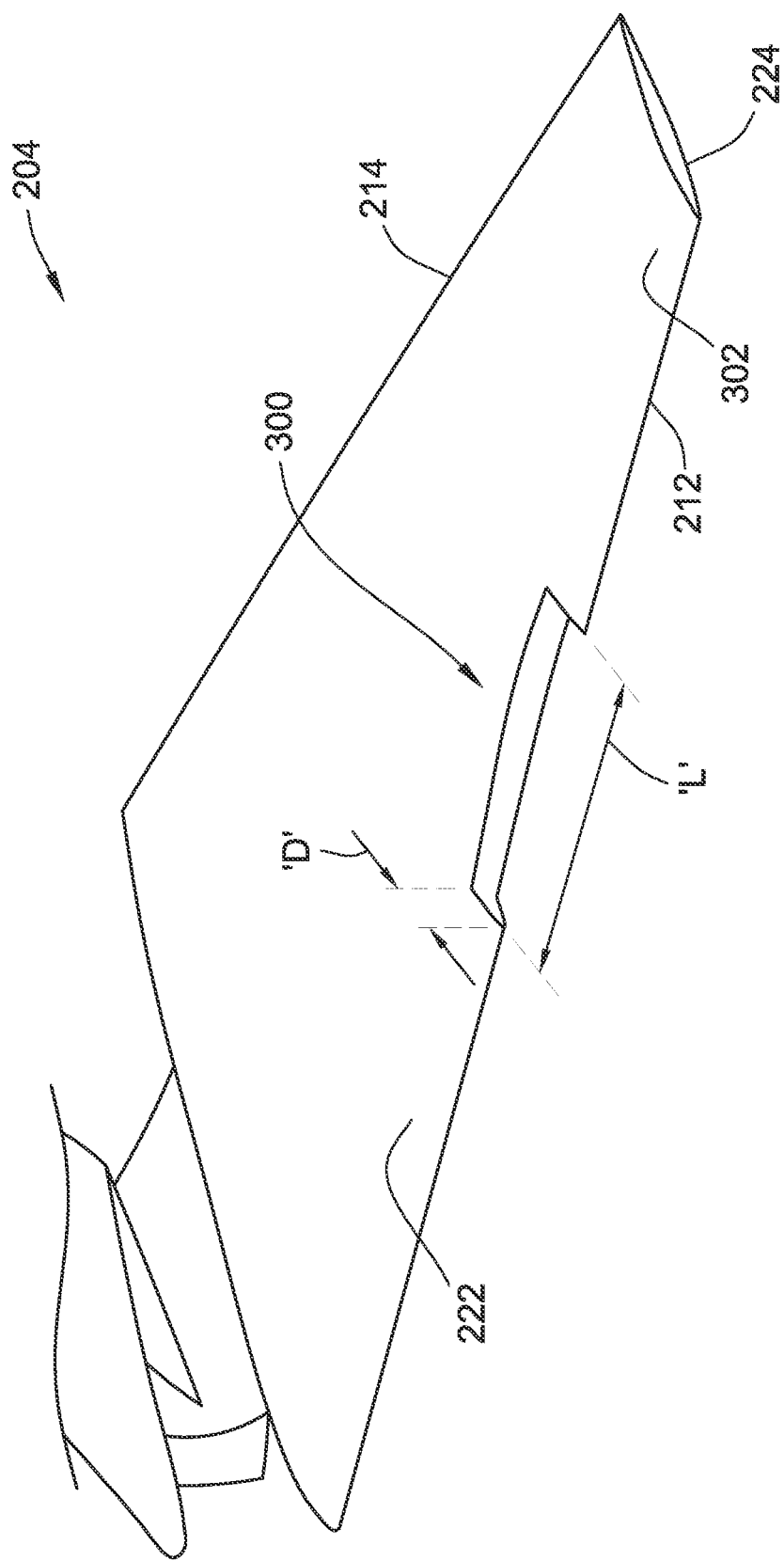
FIG. 3 is a perspective view of the example winglet of the example aircraft of FIGS. 1 and 2 in an example non-operable or damaged state.

FIG. 3 is a perspective view of the lower blade 204 of the example winglet 120 of FIGS. 1 and 2 having a damaged area 300 (e.g., a cutout). In this example, the damaged area 300 is located on the leading edge 212 of the lower blade 204. The lower blade 204 can be susceptible to impact damage (e.g., caused by airport equipment or vehicles) because an outboard section 302 of the lower blade 204 is positioned at a lower elevation relative to the ground than the wing 102 (FIG. 1). In the illustrated FIG. 3, the damaged area 300 is trimmed to remove damaged materials from lower blade 204 that can interfere with repairing the winglet 120. The damaged area 300 is a cutout in the lower blade 204 or material that has been removed from the lower blade 204. The damaged area 300 of the illustrated example has a length L and a depth D. In this example, the length L is approximately 5.5 inches and the depth D is approximately 2.5 inches. However, in other examples, the length L can be approximately between 0.5 inches and 12 inches and the depth D can be approximately between 0.5 inches and 6 inches. In some examples, the length L and/or the depth D can be any other suitable size. In some examples, the damaged area 300 to be repaired can be located along another portions of the winglet 120 (e.g., located within two-thirds of the outboard section 302 of the lower blade 204) and/or any of the other airfoil structures 101 of FIG. 1.

Figure 4:
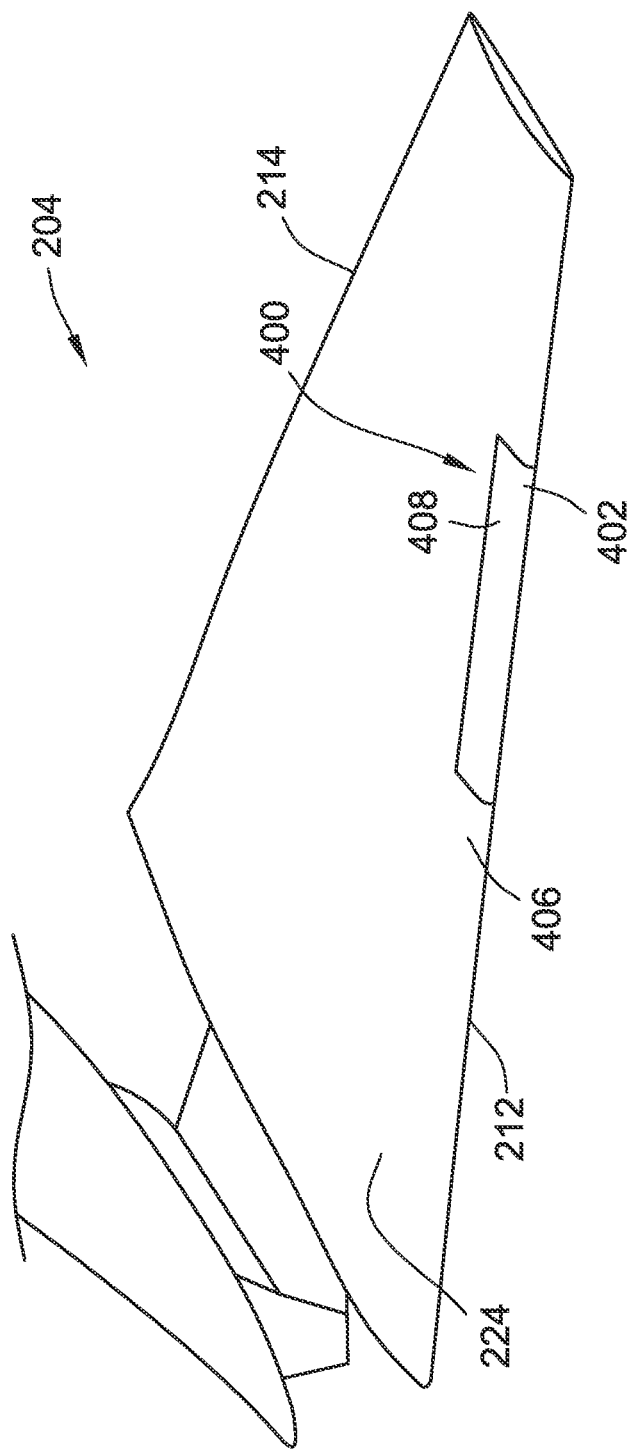
FIG. 4 is a perspective view of the example winglet of FIG. 3 being repaired with a repair doubler in accordance with teachings of this disclosure.

FIG. 4 is a perspective view of the lower blade 204 of FIGS. 1-3 having an example repair doubler 400 disclosed herein to cover the damaged area 300 of FIG. 3. The repair doubler 400 of the illustrated example can seal or cover the damaged area 300 of FIG. 3 without requiring special tooling and/or mechanical fasteners (e.g., screws or rivets). As a result, the repair doubler 400 disclosed herein allows for the repair to be performed at any location (e.g., anywhere in the world) such as airports that do not carry special tooling for such repairs. Typically, repairs to monocoque and/or semi-monocoque assemblies require special tooling such as metal forming tools. In contrast, examples disclosed herein do not require any special tooling and the repair doubler 400 can be hand formed to meet an aerodynamic contour of the monocoque and/or semi-monocoque structure to which the repair doubler is coupled.

As illustrated in FIG. 4, the repair doubler 400 includes a contour 402 (e.g., a shape or profile) that is substantially similar (e.g., complementary) to a contour 406 (e.g., a shape or profile) of the leading edge 212. In some examples, the contour 402 is accomplished by hand forming a doubler plate 408 over the damaged area 300 (FIG. 3). In the illustrated example, the doubler plate 408 is a pliable sheet of material (e.g., a thin sheet of material or sheet metal) that can be formed (e.g., hand formed) or bent to conform to a shape of a portion of the lower blade 204 (e.g., or other airfoil structure). In some examples, the contour 402 is accomplished by hand forming two sheets of material joined together (e.g., near the leading edge 212) via an adhesive or sealant. In other examples, the doubler plate 408 is a single sheet. In some examples, tooling is used to form the single sheet into a contour shape such as the contour 406. In some examples, the adhesive includes a paste, adhesive and/or sealant, any combinations thereof, and/or any other material(s). In the illustrated example, the doubler plate 408 is positioned on the upper skin 222 and the lower skin 224 and wraps around the leading edge 212 of the lower blade 204.

Figure 5:
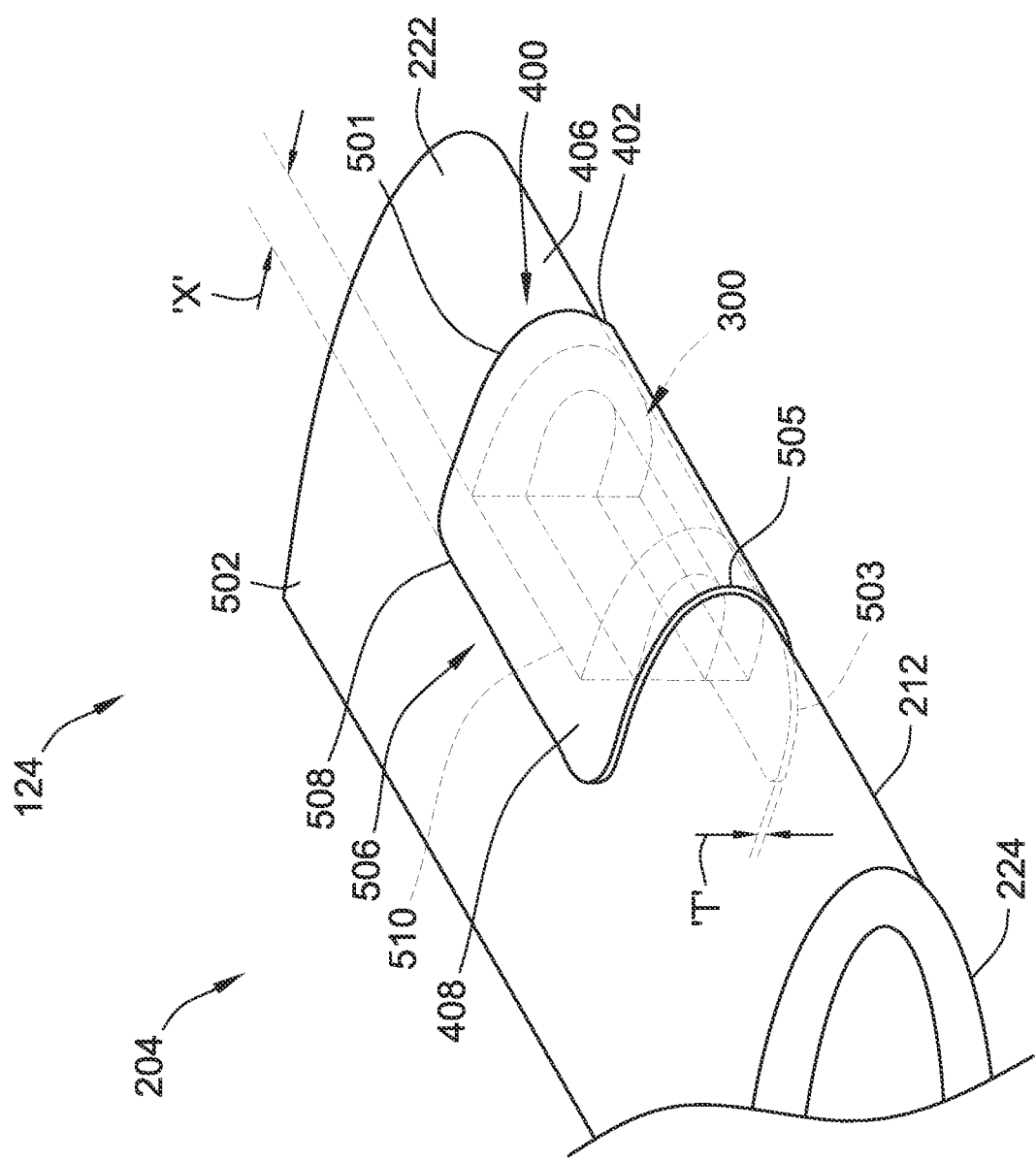
FIG. 5 is a perspective view of the example winglet of FIG. 4 in an example repaired or operable state.

FIG. 5 is another perspective view of the example lower blade 204 and the example repair doubler 400 of FIG. 4. As illustrated in FIG. 5, the doubler plate 408 (e.g., a sheet of material) is positionable over the damaged area 300 (FIG. 3) on or around the leading edge 212. For example, the repair doubler 400 and/or doubler plate 408 of the illustrated example has a first portion 501 positioned on the upper skin 222, a second portion 503 positioned on the lower skin 224, and a third portion 505 positioned on or around the leading edge 212 of the lower blade 204. Thus, the repair doubler 400 and/or the doubler plate 408 of the illustrated example has a curved or arcuate profile that conforms or is complementary to the shape of the upper skin 222, the lower skin 224 and the leading edge 212. Thus, the doubler plate 408 has a shape that is similar to at least a portion of a shape of an airfoil. The repair doubler 400 and/or doubler plate 408 of the illustrated example has a substantially smooth curvature or arcuate profile. Specifically, the repair doubler 400 and/or doubler plate 408 of the illustrated example has a C-shape profile. The doubler plate 408 (e.g., the sheet of material) of the illustrated example couples and/or attaches to a skin 502 of the lower blade 204 via a paste, adhesive and/or sealant.

The doubler plate 408 is hand formed (e.g., without use of forming tools) to provide the contour 402 substantially complementary to the contour 406 of the leading edge 212. For example, the doubler plate 408 can initially have a flat, square or rectangular shape. The doubler plate 408 is bent or formed by an operator's hands over a portion of the leading edge 212 to conform the doubler plate 408 to a shape substantially similar to the shape of the leading edge 212. To enable the doubler plate 408 to conform to the contour 402, the doubler plate 408 has a thickness T. In some examples, the thickness T of the doubler plate 408 ranges between approximately 0.040 inches to 0.080 inches. In some examples, the thickness T is approximately 0.063 inches. In some examples, the doubler plate 408 can have a thickness T that is less than 0.04 inches (e.g., 0.01 inches). The doubler plate 408 of the illustrated example is substantially light weight and, thus, does not add significant weight to the aircraft. Thus, the doubler plate 408 has a negligible effect on fuel efficiency and/or weight.

The doubler plate 408 of the illustrated example is a pliable sheet of material. For example, the doubler plate 408 can be sheet metal. In the illustrated example, the doubler plate 408 is a single piece or a uniform piece of sheet metal. In other examples, the doubler plate 408 can be a pliable plastic (e.g., vinyl), a pliable wood, a pliable metal, and/or any other material that can be bent or shaped to conform to an airfoil structure(s). In some examples, the doubler plate 408 can include aluminum (e.g., 7075-T6 clad and/or bare sheet aluminum), galvanized steel, sheet metal, corrosion resistant steel (CRES), titanium, thermoplastics, pre-cured composites, alloys and/or any other material(s) or alloy(s).

As illustrated in FIG. 5, the doubler plate 408 covers the damaged area 300 and overlaps the skin 502 adjacent the damaged area 300. Because the doubler plate 408 is shaped to conform to a shape of the leading edge 212 (e.g., an airfoil shape), the doubler plate 408 forms a portion of an outer surface or skin (e.g., the skin 502) of the lower blade 204. In other words, an edge or perimeter 508 (e.g., an end) of the doubler plate 408 engages (e.g., directly engages) the winglet 120 (e.g., the skin). For example, the perimeter 508 of the first portion 501 of the doubler plate 408 engages or overlaps the upper skin 222 (e.g., adjacent the damaged area 300), the perimeter 508 of the second portion 503 of the doubler plate 408 engages or overlaps the lower skin 224 (e.g., adjacent the damaged area 300), and the perimeter 508 of the third portion 505 of the doubler plate 408 engages or overlaps the leading edge 212 (e.g., adjacent the damaged area 300).

A tape or seal (e.g., the tape 604 of FIG. 6) (e.g., a layer of tape) is positioned at least partially along a portion of an interface 506 between the perimeter 508 of the doubler plate 408 and a perimeter or an edge 510 (e.g., a cutout) of the skin 502 adjacent the damaged area 300. In the illustrated example, the doubler plate 408 overlaps the skin 502 (e.g., the edge 510 of the damaged area 300) by an overlap thickness X. In some examples, the overlap thickness X can be approximately between 1.5 inches and 3 inches (e.g., 2 inches). In some examples, the overlap thickness X can be any other suitable thickness greater than 1.5 inches. In some examples, two or more layers of tape can be applied.

Figure 6:
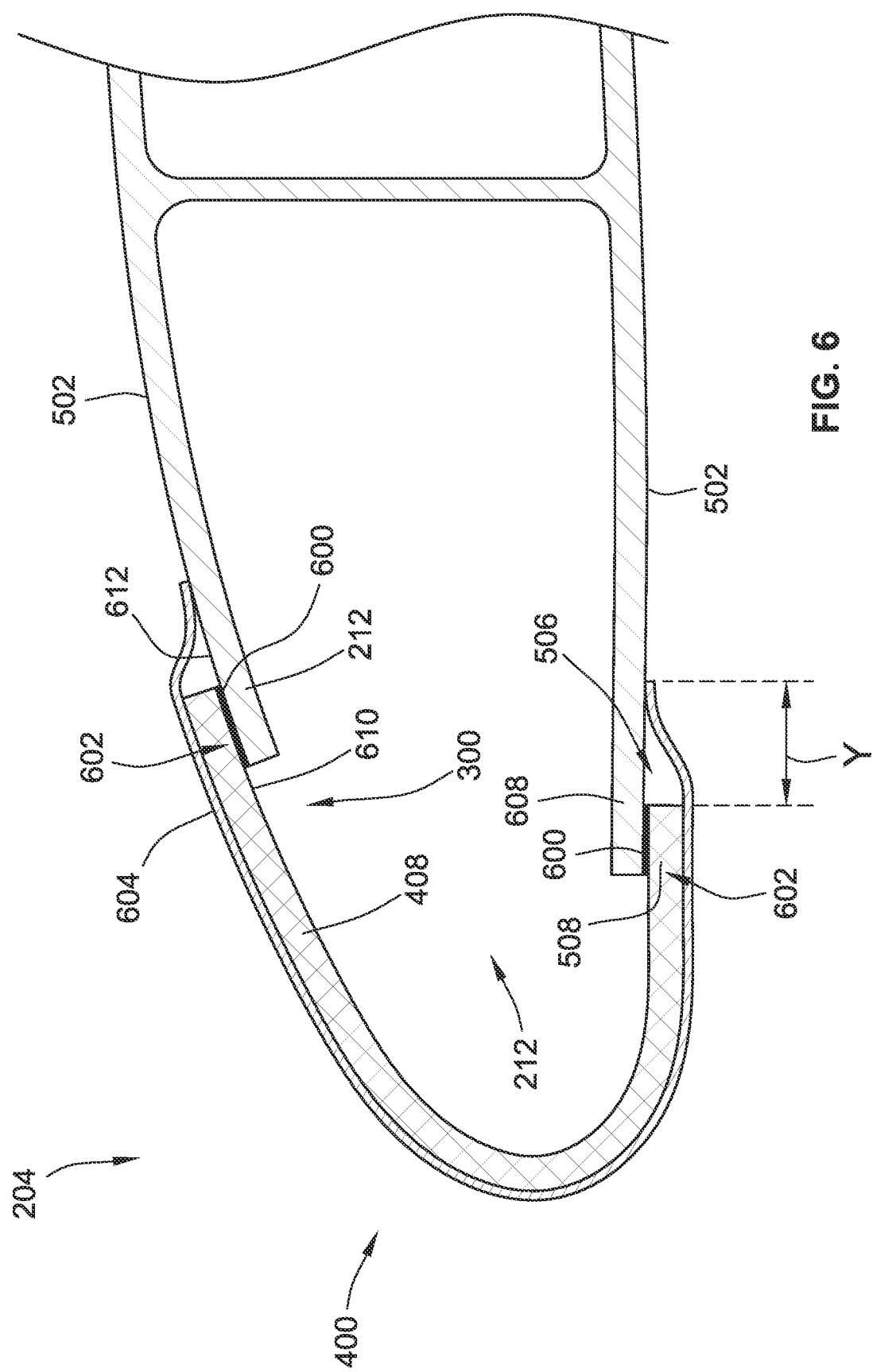
FIG. 6 is an example cross-sectional view of the example repair doubler and the example winglet of FIG. 5.

FIG. 6 illustrates an example cross-sectional view of the lower blade 204 and the example repair doubler 400 of FIG. 4. The repair doubler 400 is positioned over the damaged area 300 and coupled and/or attached to the skin 502 adjacent the leading edge 212. The repair doubler 400 is coupled and/or attached to the skin 502 via an adhesive 600. In some examples, the adhesive 600 is placed between the doubler plate 408 and the skin 502 of the leading edge 212. As shown in FIG. 6, the doubler plate 408 overlaps the leading edge 212 of the lower blade 204 adjacent an edge 602 (e.g., a point) of the damaged area 300 adjacent the leading edge 212. In some examples, the adhesive 600 includes a paste, adhesive, sealant, structural glue, etc. The adhesive 600 is added to a bottom or rear side 610 of the doubler plate 408 and/or a surface 612 of the skin 502. In some examples, the adhesive 600 is added to at a portion of at least one of the perimeter 508 of the doubler plate 408 or the perimeter 508 of the skin 502 adjacent or outlining the damaged area 300. The example repair doubler 400 further includes the layer of tape 604 positioned over at least a portion of the interface 506 of the doubler plate 408 and the skin 502. In some examples, the tape 604 overlaps an edge 608 of the skin 502 by the length Y (e.g., an overlap of approximately 2 inches). In other examples, the tape 604 covers an entirety of the perimeter 508 (FIG. 5) of the doubler plate 408. In other examples, the tape 604 covers an entirety of the doubler plate 408 (e.g., an entire surface area or exposed surface of the doubler plate 408). In some examples, the layer of tape 604 can be an aluminum pressure-sensitive tape, aircraft speed tape (e.g., aluminum speed tape), foil tape, etc. As illustrated in FIG. 6, the doubler plate 408 is a single or unitary sheet. In other examples, the doubler plate 408 includes a plurality of sheets coupled together via adhesive.

Figure 7:
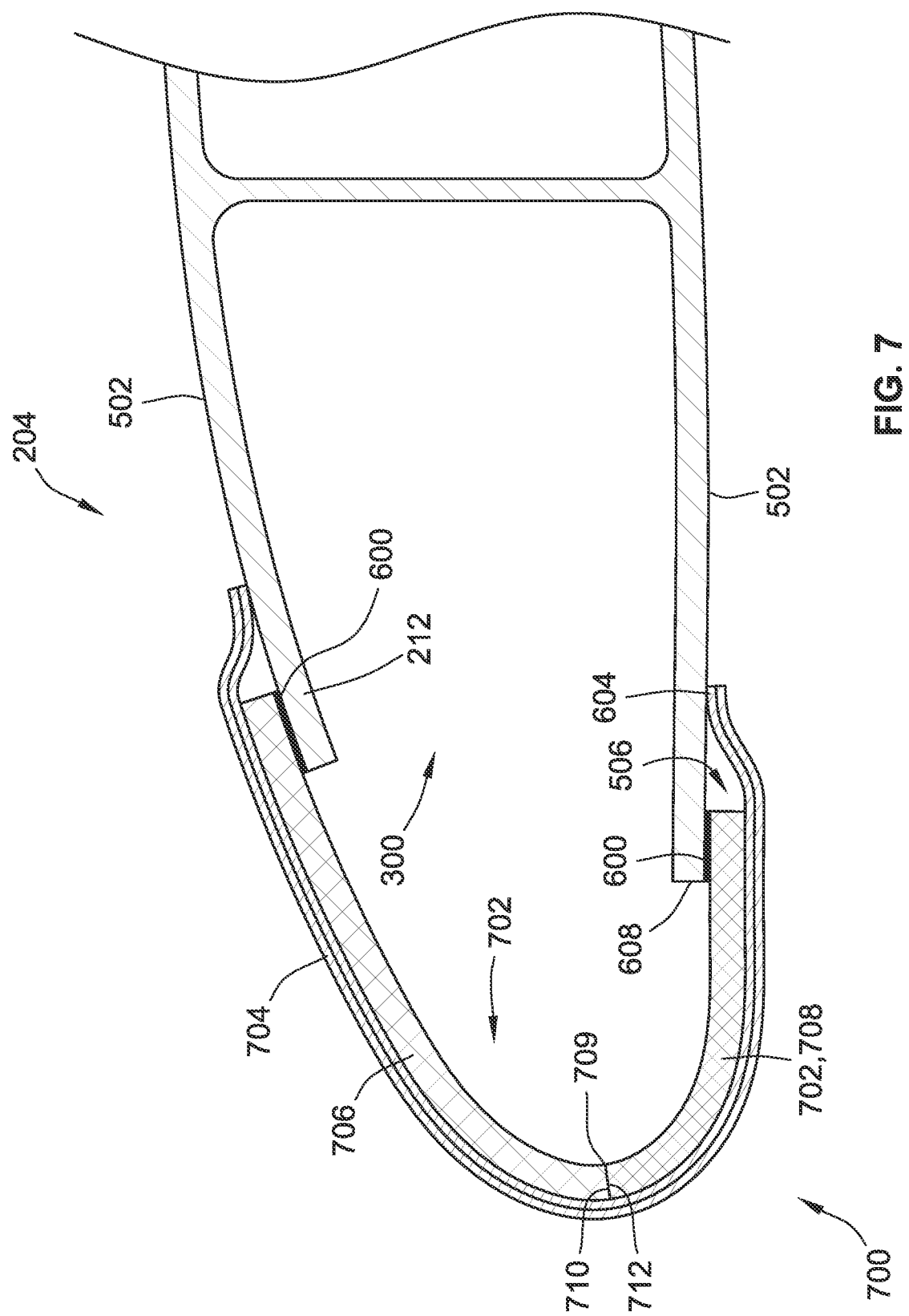
FIG. 7 is a cross-sectional view of another example repair doubler disclosed herein.

FIG. 7 is a cross-sectional view of another example repair doubler 700 disclosed herein. Many of the components of the example repair doubler 700 of FIG. 7 are substantially similar or identical to the components of the repair doubler 400 described above in connection with FIGS. 4-6. As such, those components will not be described in detail again below. Instead, the interested reader is referred to the above corresponding descriptions for a complete written description of the structure and operation of such components. To facilitate this process, similar or identical reference numbers will be used for like structures in FIG. 7 as used in FIGS. 1-6.

The repair doubler 700 of the illustrated example is coupled and/or attached to the skin 502 of the lower blade 204 via adhesive 600. The repair doubler 700 of the illustrated example includes a doubler plate 702, a first layer of tape 604, a second layer of tape 704, and adhesive 600. The doubler plate 702 of the illustrated example includes a first sheet of material (e.g., sheet metal) or first doubler plate 706 and a second sheet of material (e.g., sheet metal) or a second doubler plate 708. Although this example shows the first doubler plate 706 and the second doubler plate 708, the examples herein shall not be limited to two doubler plates. In other examples, the doubler plate 702 can include a plurality of doubler plates or sheets of material (e.g., more than two sheets, three doubler plates or sheets of material, six doubler plates or sheets of material, etc.). In some examples, the first doubler plate 706 and the second doubler plate 708 are bonded and/or attached via an adhesive 709 (e.g., structural glue, sealant, paste, etc.). In some examples, the adhesive 709 is added to a first abutting end 710 of the first doubler plate 706 and/or a second abutting end 712 of the second doubler plate 708. The first and second doubler plates 706, 708 are bonded together and positioned at the leading edge 212 forming an airfoil shape. In some examples, a layer of tape (e.g., the tape 604, 704) can be applied to a seam formed between the abutting ends 710, 712. In some examples, the tape can be applied to the seam in addition to or instead of the adhesive 709. Employing the first doubler plate 706 and the second doubler plate 708 (e.g., multiple doubler plates) facilitates formation of the doubler plate 702 to a shape of the lower blade 204. For example, the first doubler plate 706 is formed or bent along the upper skin 222 of the lower blade 204 and a portion of the leading edge 212 adjacent the damaged area 300. Similarly, the second doubler plate 708 is formed or bent along the lower skin 224 of the lower blade 204 and a portion of the leading edge 212 adjacent the damaged area 300. With the first doubler plate 706 conforming to a first portion of the leading edge 212 and the second doubler plate 708 conforming to a second portion of the leading edge 212, the first doubler plate 706 and the second doubler plate 708 can be jointed at respective abutting ends 710, 712 to define the doubler plate 702 to cover the damaged area 300 of the leading edge 212 of the lower blade 204.

The sizes and shapes of the first and second doubler plates 706, 708 can vary. In some examples, the shape of the first and second doubler plates 706, 708 are rectangular or flat and are bent during formation of the first and second doubler plates 706, 708. In other examples, the shape of the first and second doubler plates 706, 708 are polygonal. The first and second doubler plates 706, 708 can be constructed from a variety of materials, including, but not limited to, aluminum (e.g., 7075-T6 clad and/or bare sheet aluminum), galvanized steel, sheet metal, corrosion resistant steel (CRES), titanium, thermoplastics, pre-cured composites and/or any other material that can conform to a shape of the leading edge 212 of an airfoil. The first and second doubler plates 706, 708 can be constructed from the same or different materials.

The example repair doubler 700 further includes the first layer of tape 604 positioned over at least a portion of an interface 506 of the doubler plate 702 and an edge 608 of the skin 502. In the illustrated example, the second layer of tape 704 is positioned over at least a portion of the interface 506 of the doubler plate 702 and the edge 608 of the skin 502. In some examples, the first layer of tape 604 and the second layer of tape 704 can be aluminum pressure-sensitive tape, speed tape, foil tape, aircraft speed tape, etc. In other examples, the first layer of tape 604 and the second layer of tape 704 can be the same or different materials. Although FIG. 7 shows two layers of tape 604, 704, the examples herein shall not be limited thereto. In some examples, the repair doubler 700 includes more than two layers of tape 604, 704 (e.g., three layers of tape, six layers of tape, etc.). The second layer of tape 704 can be positioned in an offset or overlapping relationship with the first layer of tape 604. For example, the second layer of tape 704 can overlap the first layer of tape 604 by a distance of approximately between 1 inch and 2 inches (e.g., one and half inches).

Figure 8:
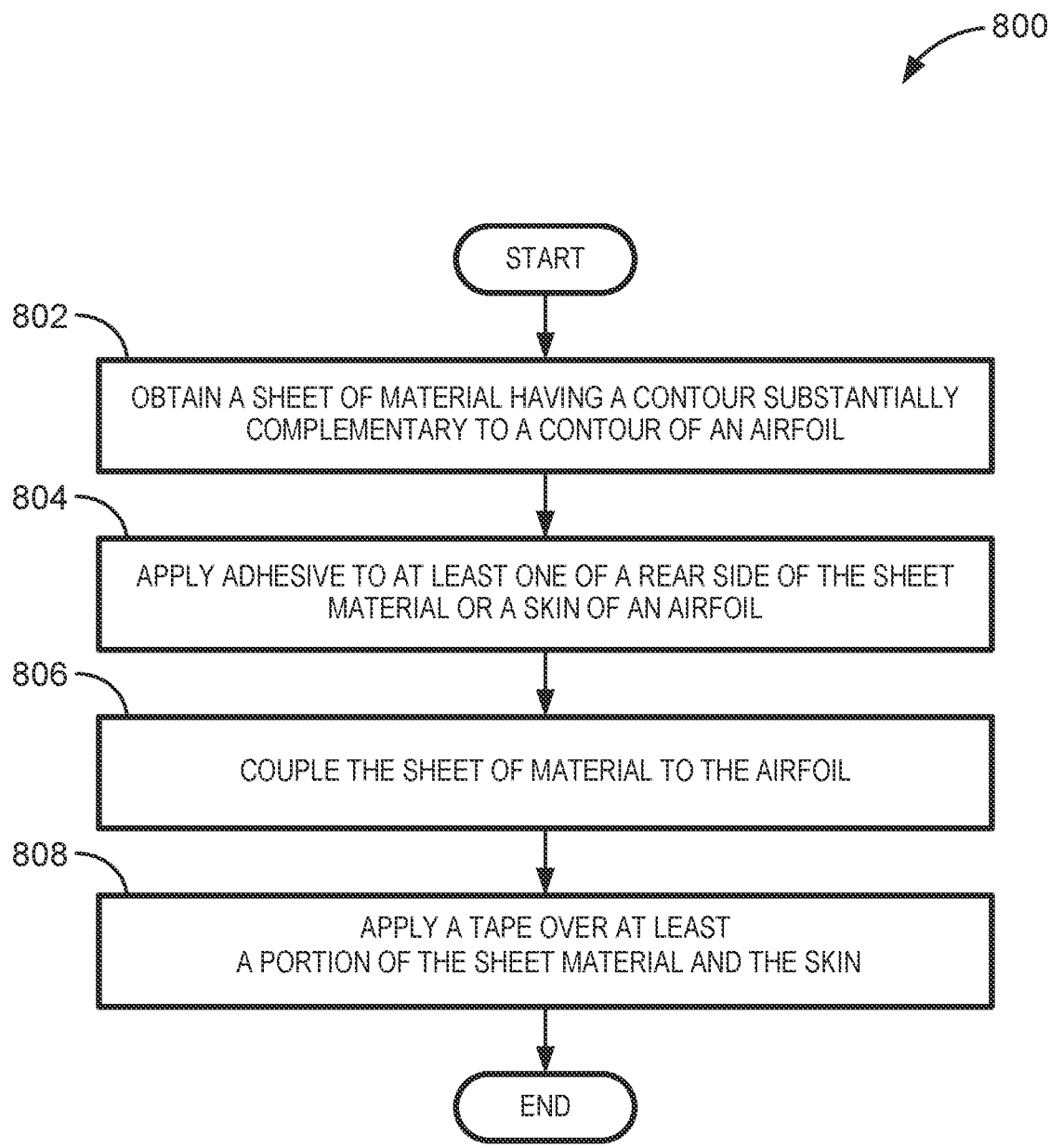
FIG. 8 is a flowchart representative of an example method of manufacturing the example repair doubler of FIGS. 4-6.

FIG. 8 is a flowchart representative of an example method 800 of providing the example repair doubler 400 of FIGS. 4-7 to the damaged area 300 without the use of mechanical fasteners (e.g., screws, rivets, etc.) and without requiring any special tooling. Although the example method is described with reference to the flowchart illustrated in FIG. 8, many other methods can be alternatively used. For example, the order of execution of the blocks can be changed, and/or some of the blocks can be combined, divided, re-arranged, omitted, eliminated, and/or implemented in any other way.

The example method 800 of FIG. 8 begins at block 802, at which a sheet of material is obtained having a contour substantially complementary to a contour of an airfoil. In some examples, the airfoil corresponds to the leading edge 212 or the trailing edge 210, 214 of FIGS. 2-7. In some examples, the sheet of material corresponds to the doubler plate 408 of FIGS. 4-7. In some examples, a contour of the sheet of material is obtained by hand forming the sheet of material over the airfoil. For example, the doubler plate 408 can initially have a substantially flat, square or rectangular shape. In some instances, the doubler plate 408 hand formed over the leading edge 212 adjacent the damaged area 300 to change the shape of the doubler plate 408 from a substantially flat, square or rectangular shape to a contour substantially similar to the contour of the leading edge 212. After formation of the doubler plate 408 with the counter of the airfoil or leading edge 212, the bent doubler plate 408 is slid and/or shifted over the damaged area 300 of the leading edge 212 to cover or overlap the damaged area 300. In some examples, the doubler plate 408 can be pre-formed or can already have an airfoil shape. Such configuration eliminates the need for an operator to form the doubler plate 408. As used herein, substantially complementary means that the sheet of material has a similar contour (e.g., radius of curvature within plus or minus 10%) as a leading edge of an airfoil, wing or blade (such as, a vertical stabilizer, a horizontal stabilizer, a winglet, etc.). In some examples, a tool is used to form the contour shape.

At block 804, an adhesive is applied to at least one of a rear side of the sheet material or a skin of an airfoil. In some examples, the adhesive corresponds to the adhesive 600 of FIG. 6. Referring to FIGS. 4-6, the adhesive is applied to the rear side 610 of the doubler plate 408 and/or the surface 612 of the skin 502. In some examples, the adhesive is applied to at least a portion of a perimeter the rear side 610 of the doubler plate 408 and/or the surface 612 of the skin 502 adjacent or surrounding a perimeter of the damaged area 300 (e.g., a cutout). In some examples, the adhesive is applied to at least an entire perimeter the rear side 610 of the doubler plate 408 and/or the surface 612 of the skin 502 adjacent the damaged area 300.

At block 806, the sheet of material is coupled to the airfoil. In other words, the sheet of material is coupled to the leading edge over (e.g., to cover) the damaged area 300.

At block 808, tape is applied and/or coupled over at least a portion of the sheet material and the skin. Referring to FIGS. 5-7, the tape 604 is applied to the doubler plate 408 and the skin 502. Specifically, the tape 604 is applied along at least a portion of the perimeter 508 of the doubler plate 408. After completion of block 808, the example method 800 of FIG. 8 ends, and the repair doubler is completed allowing the aircraft to operate until a permanent repair can be completed. In some examples, the repair doubler disclosed herein can provide a temporary fix that enables the aircraft to operate for six months or 250 cycles, whichever comes first.

Figure 9:
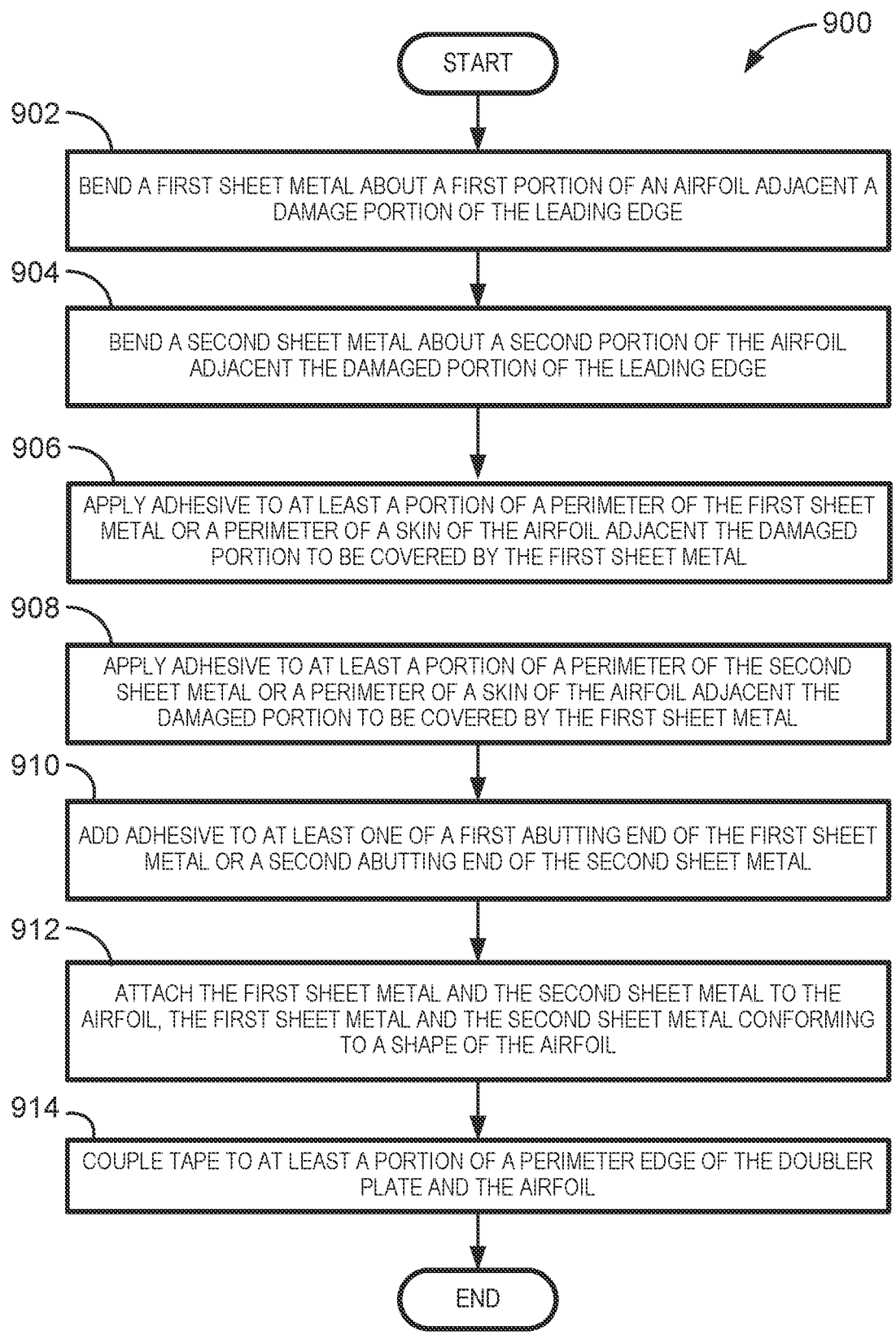
FIG. 9 is another flowchart representative of another example method of manufacturing the example repair doubler of FIG. 7.

FIG. 9 is another flowchart representative of another example method 900 of manufacturing the example repair doubler 700 of FIG. 7 without the use of fasteners and without requiring any special tooling. Although the example method of manufacture is described with reference to the flowchart illustrated in FIG. 9, many other methods can be alternatively used. For example, the order of execution of the blocks can be changed, and/or some of the blocks can be combined, divided, re-arranged, omitted, eliminated, and/or implemented in any other way.

The example method 900 of FIG. 9 begins at block 902, at which a first sheet of metal is bent about a first portion of an airfoil (e.g., a leading edge of a wing) adjacent to a damaged portion of the airfoil. Referring to FIG. 7, the first doubler plate 706 is bent or formed along a first portion of the leading edge 212 of the lower blade 204. For instance, the first doubler plate 706 is bent over a portion of the upper skin 222 of the lower blade 204 and a portion of the leading edge 212.

At block 904, a second sheet of metal is bent about a second portion of the airfoil adjacent to the damaged portion of the airfoil. Referring to FIG. 7, the second doubler plate 708 is bent or formed along a second portion of the leading edge 212 of the lower blade 204. For instance, the second doubler plate 706 is bent over a portion of the lower skin 224 of the lower blade 204 and a portion of the leading edge 212. In some examples, the first and second sheet of metal is bent by hand about the first and second portion of the leading edge, respectively. One aspect of bending the first and second sheet of metal (e.g., the doubler plates 706, 708) by hand is that the process does not require any special tooling so that the repair can be completed in remote locations. However, in some instances the first and second sheet of metal can be formed over a complementary (same as leading edge) shaped tool. In some examples, the first and second sheets of material can be pre-formed via the complementary tool. The first sheet metal and the second sheet metal conform to a shape of the airfoil.

At block 906, an adhesive is added to at least one of a perimeter of the first sheet metal or a perimeter of the airfoil adjacent to the damaged portion to be covered by the first sheet metal. Referring to FIG. 7, adhesive 600 is applied to a rear side or surface adjacent a perimeter edge of the first doubler plate 706 and/or on the skin 502 of the leading edge 212 adjacent a perimeter edge of the damaged area 300 to be covered by the first doubler plate 706.

At block 908, an adhesive is added to at least one of a perimeter of the second sheet metal or a perimeter of the airfoil adjacent to the damaged portion to be covered by the second sheet metal. Referring to FIG. 7, adhesive 600 is applied to a rear side or surface adjacent a perimeter edge of the second doubler plate 708 and/or on the skin 502 of the leading edge 212 adjacent a perimeter edge of the damaged area 300 to be covered by the second doubler plate 708.

At block 910, an adhesive is added to at least a first abutting end of the first sheet metal or a second abutting end of the second sheet metal. Referring to FIG. 7, adhesive 709 is added to abutting ends 710, 712 of the respective first doubler plate 706 and the second doubler plate 708 to form the doubler plate 702. However, in some examples, adhesive 709 is added to only the abutting end 710 or the abutting end 712. The example method 900 includes the first sheet metal and the second sheet metal, however, the examples shall not be limited thereto. In some examples, the method 900 can include the doubler plate having more than two sheets of material or metal (e.g., three sheets, four sheets, etc.) that can be joined together as a single doubler plate.

At block 912, the first sheet metal and the second sheet metal are attached to the airfoil. For example, the first sheet metal 7 In some examples, the doubler plate 702 is fixed, coupled or attached to the skin 502 via the adhesive 600. The doubler plate 702 is positioned over the damaged area 300 to cover the damaged area 300. In other words, the doubler plate 702 forms an outer surface of the airfoil and/or the leading edge 212 of the lower blade 204. The abutting ends 710, 712 engage or couple together to form the doubler plate 702. In some examples, the first sheet metal is attached to the airfoil prior to the second sheet metal. In some examples, the second sheet metal is attached to the airfoil prior to the first sheet metal. In some examples, the first sheet metal is attached to the second sheet metal to form a doubler plate and then the first sheet metal and the second sheet metal are attached to the airfoil together or simultaneously.

At block 914, tape is coupled to at least a portion of a perimeter edge of the doubler plate and the airfoil. Referring to FIG. 7, the first layer of tape 604 is applied to the doubler plate 702 and a portion of the skin 502 adjacent the perimeter edge of the doubler plate 702. The second layer of tape 704 is applied to the first layer of tape 604 and/or the skin 502. After completion of block 912, the example method 900 of FIG. 9 ends, and the repair doubler is completed allowing the aircraft to operate normally until a permanent repair can be completed. In some examples, the repair doubler enables aircraft operation for six months or 250 cycles, whichever comes first.

Although each example repair doubler (e.g., the repair doubler 400, 700) disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, apparatus, articles of manufacture, and methods have been disclosed that produce a repair for monocoque assemblies that can completed quickly and in remote location. The examples disclosed herein do not require fasteners or special tooling. Furthermore, the example repairs disclosed herein are lightweight and do not require the removal of the winglet. The examples disclosed herein use standard repair materials which allow for quick repair turnarounds. Disclosed systems, apparatus, articles of manufacture, and methods that save time and cost of repairing damaged monocoque and/or semi-monocoque assemblies described herein. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to repair monocoque or semi-monocoque structures are disclosed herein. Further examples and combinations thereof include the following:

Example 1 includes an apparatus to repair a semi-monocoque wing comprising a doubler plate configured to be coupled to a skin of the semi-monocoque wing via a first adhesive, the doubler plate having a contour substantially complementary to a contour of a leading edge of the semi-monocoque wing, and a layer of tape positioned at least partially along at least a portion of an interface between an edge of the doubler plate and the leading edge of the skin.

Example 2 includes the apparatus as defined in example 1, wherein the doubler plate includes a first doubler plate attached to a second doubler plate via a second adhesive.

Example 3 includes the apparatus as defined in any one of examples 1-2, wherein the tape overlaps at least one of the edge of the doubler plate or the leading edge of the skin by a range of example 1 includes 5 inches and 3 inches.

Example 4 includes the apparatus as defined in any one of examples 1-3, wherein the first adhesive includes at least one of a paste, adhesive or sealant.

Example 5 includes the apparatus as defined in any one of examples 1-4, wherein the doubler plate has a thickness between approximately example 0 includes 040 inches and example 0 includes 080 inches.

Example 6 includes the apparatus as defined in any one of examples 1-5, wherein the doubler plate includes aluminum.

Example 7 includes the apparatus as defined in any one of examples 1-6, wherein the doubler plate includes galvanized steel.

Example 8 includes the apparatus as defined in any one of examples 1-7, wherein the tape is speed tape.

Example 9 includes the apparatus as defined in any one of examples 1-8, wherein the wing is a winglet and the leading edge is located on a lower blade of the winglet.

Example 10 includes the apparatus as defined in any one of examples 1-9, wherein the wing is a vertical stabilizer and the leading edge is on the vertical stabilizer.

Example 11 includes a method to repair a semi-monocoque wing comprising obtaining a sheet of material having a contour substantially complementary to a contour of a leading edge of the semi-monocoque wing, applying adhesive to at least one of a rear side of the sheet of material or a skin of the semi-monocoque wing, coupling the sheet of material over a portion of the leading edge of the semi-monocoque wing to couple the sheet of material and the skin via the adhesive, applying a tape over at least a portion of the sheet of material and the skin.

Example 12 includes the method as defined in example 11, wherein the coupling of the sheet of material includes positioning the sheet of material over a damaged portion of the leading edge of the wing.

Example 13 includes the method as defined in any one of examples 11-12, wherein the obtaining of the sheet of material includes bending the sheet of material over a portion of the leading edge of the wing adjacent the damaged portion to shape the sheet of material substantially complementary to the shape of the leading edge.

Example 14 includes the method as defined in any one of examples 11-13, wherein the coupling of the tape includes applying the tape along an entirety of an interface between an edge of the sheet of material and the leading edge of the skin.

Example 15 includes the method as defined in any one of examples 11-14, wherein the sheet of material includes a first sheet of material attached to a second sheet of material via a second adhesive.

Example 16 includes the method as defined in any one of examples 11-15, wherein the sheet of material includes aluminum.

Example 17 includes the method as defined in any one of examples 11-16, wherein the tape overlaps the skin by a range of example 1 includes 5 inches and 3 inches.

Example 18 includes a method to repair a semi-monocoque wing comprising bending a first sheet metal about a first portion of a leading edge of a wing adjacent a damaged portion of the leading edge, bending a second sheet metal about a second portion of the leading edge of the wing adjacent the damaged portion of the leading edge, the second portion different than the first portion, adding adhesive to at least one of abutting ends of the first sheet metal and the second sheet metal to couple the first sheet metal and the second sheet metal to form a doubler plate, the first sheet metal and the second sheet metal forming an airfoil shape complementary to an airfoil shape of the leading edge of the wing when the first sheet metal is coupled to the second sheet metal, applying adhesive to a least one of a perimeter of the doubler plate or a perimeter of a skin of the wing adjacent the damaged portion, attaching the doubler plate to the skin of the wing, and coupling tape to at least a portion of a perimeter edge of the doubler plate and the skin adjacent the perimeter edge of the doubler plate.

Example 19 includes the method as defined in example 18, wherein the attaching of the tape includes applying the tape along the entirety of the perimeter of the doubler plate and the skin of the wing adjacent to the damaged portion.

Example 20 includes the method as defined in any one of examples 18-19, wherein the tape overlaps a range of example 1 includes 5 inches and 3 inches on the skin adjacent the perimeter of the doubler plate.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A method to repair a semi-monocoque wing comprising:
   bending a first sheet metal about a first portion of a leading edge of a wing adjacent a damaged portion of the leading edge;
   bending a second sheet metal about a second portion of the leading edge of the wing adjacent the damaged portion of the leading edge, the second portion different than the first portion;
   joining abutting ends of the first sheet metal and the second sheet metal to couple the first sheet metal and the second sheet metal to form a doubler plate, the first sheet metal and the second sheet metal forming an airfoil shape complementary to an airfoil shape of the leading edge of the wing when the first sheet metal is coupled to the second sheet metal;
   applying adhesive to at least one of a rear side of the doubler plate or a skin of the semi-monocoque wing;
   coupling the doubler plate over a portion of the leading edge of the semi-monocoque wing to couple the doubler plate and the skin via the adhesive; and
   applying a tape over at least a portion of the doubler plate and the skin.

2. The method as defined in claim 1, wherein the applying the tape includes applying the tape along an entirety of an interface between an edge of the sheet of material and the leading edge of the skin.

3. The method as defined in claim 1, wherein the doubler plate has a thickness between approximately 0.040 inches and 0.080 inches.

4. The method as defined in claim 1, wherein the tape is speed tape.

5. The method as defined in claim 1, wherein the wing is a winglet and the leading edge is located on a lower blade of the winglet.

6. The method as defined in claim 1, wherein applying the tape includes applying the tape along an entirety of an interface between an edge of the doubler plate and the leading edge of the skin.

7. The method as defined in claim 1, wherein applying the tape includes overlapping the skin with the tape by a distance of between 1.5 inches and 3 inches.

8. A method to repair a semi-monocoque wing comprising:
   bending a first sheet metal about a first portion of a leading edge of a wing adjacent a damaged portion of the leading edge;
   bending a second sheet metal about a second portion of the leading edge of the wing adjacent the damaged portion of the leading edge, the second portion different than the first portion;
   joining abutting ends of the first sheet metal and the second sheet metal to couple the first sheet metal and the second sheet metal to form a doubler plate;
   applying adhesive to at least one of a rear side of the doubler plate sheet of metal or a skin of the semi-monocoque wing;
   coupling the doubler plate over a portion of the leading edge of the semi-monocoque wing to couple the doubler plate and the skin via the adhesive; and
   applying a tape over at least a portion of the doubler plate and the skin.

9. The method as defined in claim 8, wherein the doubler plate includes aluminum.

10. The method as defined in claim 8, wherein the doubler plate has a thickness of between approximately 0.040 inches and 0.080 inches.

11. The method as defined in claim 8, wherein the tape overlaps the skin by a range of 1.5 inches to 3 inches.

12. A method to repair a semi-monocoque wing comprising:
   bending a first sheet metal about a first portion of a leading edge of a wing adjacent a damaged portion of the leading edge;
   bending a second sheet metal about a second portion of the leading edge of the wing adjacent the damaged portion of the leading edge, the second portion different than the first portion;
   adding adhesive to at least one of abutting ends of the first sheet metal and the second sheet metal to couple the first sheet metal and the second sheet metal to form a doubler plate, the first sheet metal and the second sheet metal forming an airfoil shape complementary to an airfoil shape of the leading edge of the wing when the first sheet metal is coupled to the second sheet metal;
   applying adhesive to a least one of a perimeter of the doubler plate or a perimeter of a skin of the wing adjacent the damaged portion;
   attaching the doubler plate to the skin of the wing; and
   coupling tape to at least a portion of a perimeter edge of the doubler plate and the skin adjacent the perimeter edge of the doubler plate.

13. The method as defined in claim 12, wherein the attaching of the tape includes applying the tape along an entirety of the perimeter of the doubler plate and the skin of the wing adjacent to the damaged portion.

14. The method as defined in claim 12, wherein the tape overlaps a range of 1.5 inches and 3 inches on the skin adjacent the perimeter of the doubler plate.

15. The method as defined in claim 12, wherein the adhesive includes at least one of glue, paste or sealant.

* * * * *